United States Patent

McLelland et al.

[11] Patent Number: 5,950,876
[45] Date of Patent: Sep. 14, 1999

[54] INSERT MOLDED TAMPER EVIDENT POURING SPOUT

[75] Inventors: Douglas M. McLelland, Ft. Wayne; Jeffery L. Hess, Butler, both of Ind.

[73] Assignee: Rieke Corporation, Auburn, Ind.

[21] Appl. No.: 08/906,282

[22] Filed: Aug. 5, 1997

[51] Int. Cl.[6] ................................................ B65D 25/44
[52] U.S. Cl. .................... 222/153.06; 222/529; 222/530; 222/541.9; 222/566
[58] Field of Search ...................... 222/153.02, 153.06, 222/529, 530, 541.9, 566

[56] References Cited

U.S. PATENT DOCUMENTS

| | | |
|---|---|---|
| 2,156,801 | 5/1939 | Clark . |
| 2,661,128 | 12/1953 | Rieke .................................. 222/530 X |
| 3,613,966 | 10/1971 | Summers ................................ 222/529 |
| 3,802,594 | 4/1974 | Lemelson . |
| 4,105,141 | 8/1978 | Lane et al. ..................... 222/153.06 X |
| 4,236,629 | 12/1980 | Dwinell .................................... 222/529 |
| 4,294,382 | 10/1981 | Summers et al. ........................ 222/529 |
| 4,320,861 | 3/1982 | Rieke et al. ........................ 222/529 X |
| 4,422,563 | 12/1983 | Babiol ................................ 222/530 X |
| 4,485,064 | 11/1984 | Laurin . |
| 4,632,282 | 12/1986 | Nagashima ............................. 222/529 |
| 4,999,147 | 3/1991 | Kojima et al. . |
| 5,104,603 | 4/1992 | Saitoh . |
| 5,221,028 | 6/1993 | Dwinell .................................. 222/529 |
| 5,601,099 | 2/1997 | McLelland et al. ..................... 222/530 |
| 5,601,215 | 2/1997 | Stolz .................................. 222/530 X |
| 5,788,100 | 8/1998 | Sturk .............................. 222/153.06 X |

FOREIGN PATENT DOCUMENTS

| | | | |
|---|---|---|---|
| 0226783 | 7/1987 | European Pat. Off. ............... 222/530 |
| 2578819 | 9/1986 | France .................................. 222/529 |
| 2415419 | 10/1974 | Germany ............................... 222/530 |

*Primary Examiner*—Kevin P. Shaver
*Attorney, Agent, or Firm*—Woodard, Emhardt, Naughton, Moriarty & McNett

[57] ABSTRACT

A flexible pouring spout for material containers incorporating a tamper evident ring having the container cover molded around the peripheral edge of the spout and ring to integrally bond both the spout and its tamper-evident ring within the cover. The closure spout generally includes a flexible spout and a cap member for selectively closing the spout. A tamper evident ring is connected to the cap member by a series of frangible elements. Both the spout and the tamper evident ring include peripheral flanges which are molded directly within the container cover upon formation of the cover. The spout and cap with its tamper evident ring are inserted into the mold for the container cover with the peripheral flanges extending pivotally into the mold for the cover. Upon molding the cover, the molten plastic will envelope the flanges creating an integral bond with both the spout and tamper-evident, creating dual tamper evidence for the container closure.

11 Claims, 2 Drawing Sheets

INSERT MOLDED TAMPER EVIDENT POURING SPOUT

BACKGROUND OF THE INVENTION

I. Field of the Invention

This invention relates to pouring spouts for material containers and, in particular, to a flexible pouring spout having a container cover molded around the peripheral edge of the spout with its tamper-evident ring to provide dual evidence of tampering with the container closure.

II. Description of the Prior Art

For many years, flexible pouring spouts have been used on industrial containers to facilitate repeated closure of the container using a cap member while also providing means for pouring material from the container. The spout is nested within the closure to form a low profile allowing stacking of the containers. As necessary, the spout may be pulled out to create a pouring spout for the container. One widely known spout is constructed of a low density polyethylene (LDPE) providing flexibility while the cap member threadably secured to the spout is constructed of a high density polyethylene (HDPE).

While the closure members have been regularly improved to incorporate new features, mounting of the closure within the container lid has posed problems related to quality control and product integrity. In one well-known method, a metal ring is used to secure the spout within the container lid. The spout is positioned within an opening in the container cover. The metal ring is crimped over the outer peripheral flange of the spout to hold the spout within the cover. However, the integrity of the container is left to speculation because the closure can be removed and replaced without detection. Efforts to overcome this disadvantage have included ultrasonically welding the closure within the container cover. Although essentially bonding the closure to the lid, this product has not been widely accepted because of problems with the repeatability of the process, high capital expenditures, maintenance on the tooling and product limitations. Both of these methods for securing a closure within a container cover have additional disadvantages associated with added material costs, capital expenditures for insertion machinery, and recovery or recycling costs of multiple component containers.

SUMMARY OF THE PRESENT INVENTION

The present invention overcomes the disadvantages of the prior known container closures by providing a pouring spout with an outer tamper evident ring which are both integrally molded within the container cover during molding of the cover.

The closure spout of the present invention generally includes a flexible spout, a cap member removably threadably mounted to the spout, and an integrally molded tamper-evident ring removably secured to the cap member. The spout is preferably molded of a synthetic material such as low density polyethylene (LDPE) which allows the spout to be repeatedly extended and nested within the closure. An internal tamper evident diaphragm is molded within the spout for removal upon use of the spout. The cap and tamper evident ring are molded of a synthetic material such as high density polyethylene (HDPE). A series of frangible elements connect the tamper ring to the cap. Upon threadably connecting the cap with the tamper ring to the spout, outer peripheral flanges of the spout and tamper ring are flushly engaged.

The closure is integrally molded within the container lid upon molding of the lid itself creating a permanent bond between the lid and the closure. Specifically, the container lid is molded to the peripheral flange of the spout and tamper ring. The closure is inserted within the mold for the container cover such that the peripheral flange of the spout and tamper evident ring extend into the mold cavity. As a result, upon molding the container lid, the heat and pressure of the resin creating the lid will envelope and bond to the peripheral flange of the tamper ring and spout. The integrally molded closure cannot be removed from the container cover without clearly damaging the container and/or the closure itself includes dual evidence of tampering: the internal diaphragm of the spout and the external tamper ring of the cap member.

An additional feature of the present invention are improved bail tabs for removal of the cap member. The tabs are extended and include an undercut for easier access by the user.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
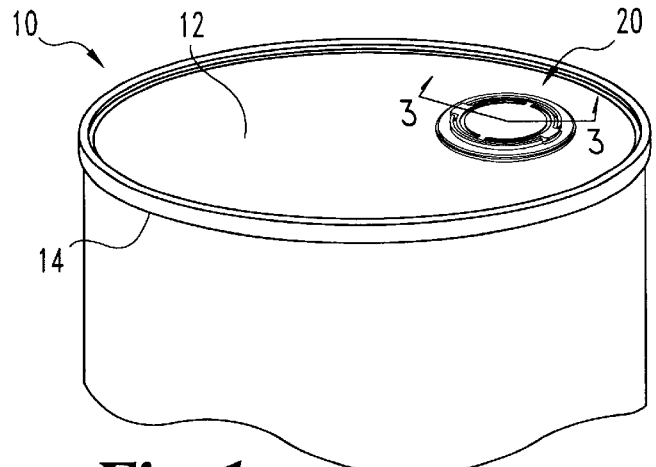
FIG. 1 is a perspective view of a portion of a container with a container cover having a closure embodying the present invention.

Referring first to FIG. 1, there is shown an upper portion of a container 10 having a container cover or lid 12 to maintain the material within the container 10. In a well known manner, the cover 12 is secured to the container 10 along a lip 14 of the container 10 after filling of the container 10. Typically, the container 10 and container cover 12 are molded of a plastic material preferably a high density polyethylene (HDPE). In order to facilitate removal of the material from the container 10, a closure 20 is formed in the container cover 12 which allows the material to be poured or pumped from the container 10. The present invention will be described in conjunction with a pouring spout closure 20 although it is to be understood that the specific type of closure may be interchanged in accordance with the present invention.

Figure 2:
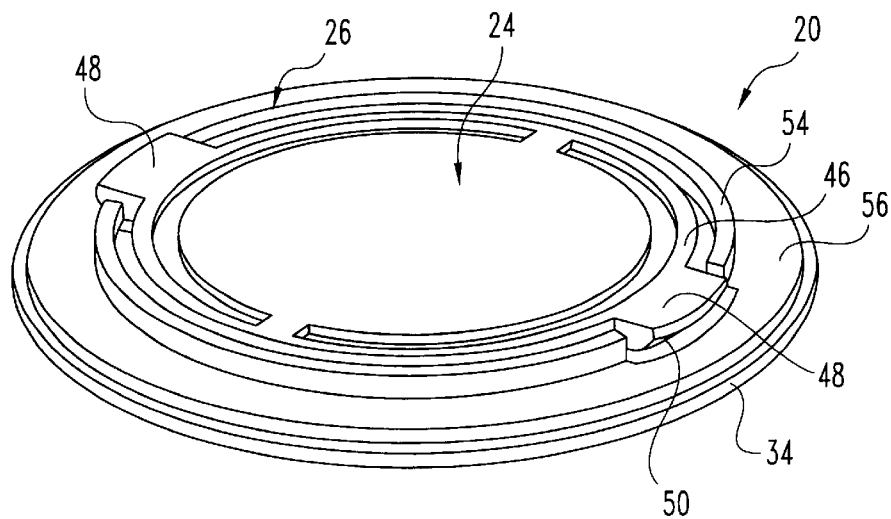
FIG. 2 is a perspective view of the closure.
Figure 3:
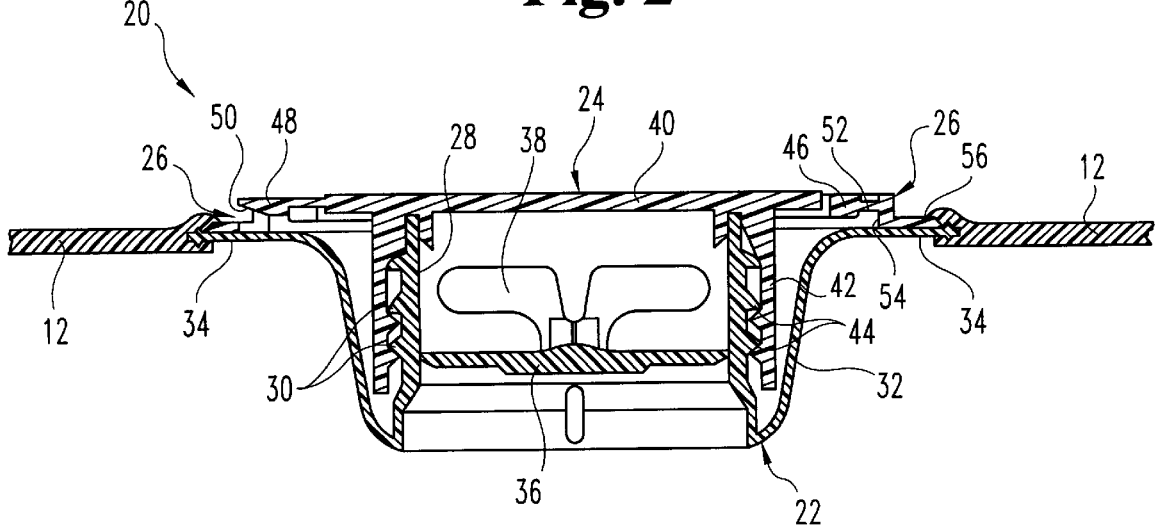
FIG. 3 is a cross-sectional view of the closure within the container cover.

Referring now to FIGS. 2 and 3, the closure 20 is shown molded directly within the container cover 12. The closure 20 generally includes a nestable spout 22 and a cap member 24 having a tamper-evident ring 26. The spout 22 and the cap member 24 with its tamper ring 26 are typically molded separately. Preferably, the spout 22 is molded of a low density polyethylene (LDPE) to provide flexibility while the cap 24 and ring 26 are molded of a high density polyethylene (HDPE). Prior to insertion within the cover 12 the cap member 24 is threadably attached to the flexible spout 22.

The flexible spout 22 has a throat portion 28, which includes external threads 30, a flexible neck portion 32 and an outer peripheral flange 34. Molded within the throat portion 28 of the spout 22 is a removable diaphragm 36 which provides internal tamper evidence for the closure 20. The diaphragm 36 has a pull ring 38 or other grasping means which allows it to be torn out of the spout 22 by the user. In the event the diaphragm 36 is missing or partially torn from the interior of the spout 22, this provides an immediate visual indication to the user that the material within the container 10 may have been tampered with. The flexible neck portion 32 allows the spout 22 to be selectively moved between the nested position shown in FIG. 2 and an extended position whereby the spout 22 extends beyond the plane of the cover 12 to facilitate the pouring of material from the container 10.

The cap 24 comprises a planar top 40 having a cylindrical portion 42 extending therefrom. The cylindrical portion 42 has internal threads 44 to cooperate with the threads 30 of the spout 22. In a preferred embodiment, the cap 24 includes bail handles 46 with bail tabs 48 to facilitate removal of the cap 24 from the spout 22 by forming a handle for rotation of the cap 24. The bail tabs 48 extend outwardly and include an angled undercut 50 to allow easier access to the bail handles 46. The extended and undercut bail tabs 48 allow the user to position their fingers beneath the tabs 48 to lift the bail handles 46 so that the cap 24 may be rotated off of and on to the spout 22 as necessary.

Figure 4:
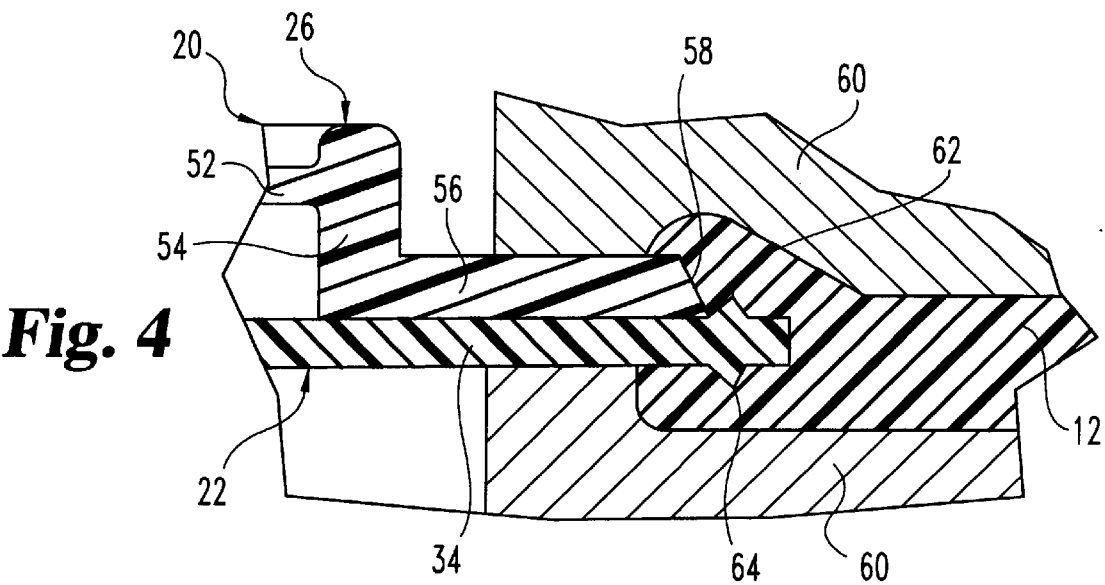
FIG. 4 is an enlarged cross-sectional view of the peripheral flange of the closure being molded to the container cover.
Figure 5:
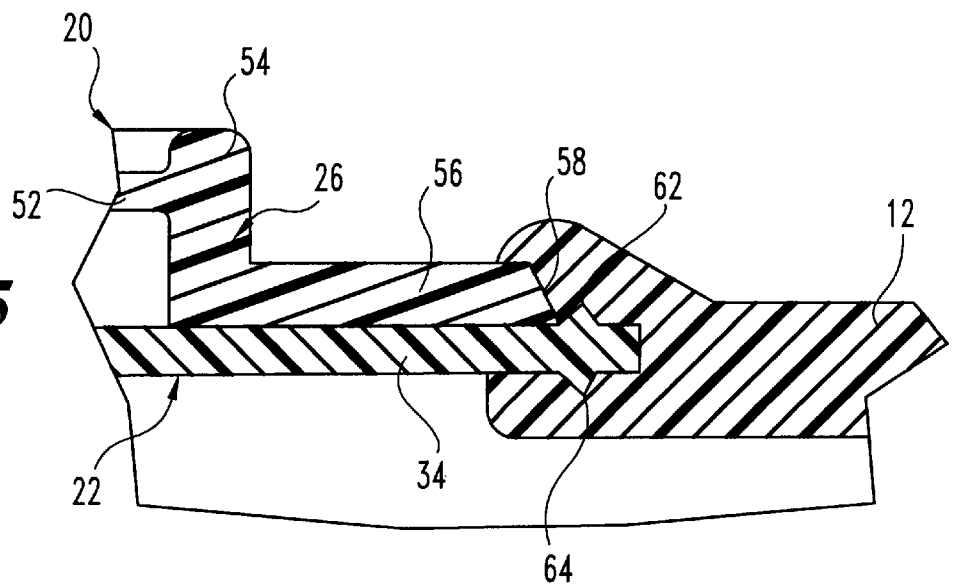
FIG. 5 is an enlarged cross-sectional view of the closure molded within the container cover.

Molded as part of the cap member 24 is the tamper evident ring 26. The tamper ring 26 is connected to the cap 24, specifically the bail handles 46 by a plurality of frangible elements 52 circumferentially spaced about the cap 24. The tamper ring 26 includes an annular ring 54 and a peripheral flange 56, the annular ring 54 having the frangible elements 52. Upon assembly of the cap 24 with the tamper ring 26 to the spout 22, the peripheral flange 56 of the tamper ring 26 lies in flush engagement with the peripheral flange 34 of the spout 22 as best shown in FIGS. 4 and 5. The tamper-evident ring 26 provides an external visual indicator of removal of the cap 24. Raising the bail handles 46 to remove the cap 24 will cause the frangible elements 52 to break providing a clear indicator that the cap 24 may have been removed.

In a preferred embodiment of the present invention, the assembled closure 20, comprising the spout 22, the cap 24 and tamper evident ring 26, is molded directly within the container cover 12. The cover 12 is molded such that it envelopes the peripheral flanges 34,56 of the closure 20 to integrally combine the spout 22, tamper ring 26 and cover 12 as shown in FIGS. 4 and 5. During molding of the cover 12, the assembled closure 20 is positioned within the mold 60 for the cover 12 such that the closure 20 forms a barrier for one portion of the mold 60. The mold 60 is sealed off against the peripheral flange 34,56 of the closure 20. As the molding material is injected into the cover mold 60, the molten material will flow over and around the flanges 34,56 to encapsulate the flanges of the closure 20 and permanently join the spout 22, tamper ring 26 and cover 12. The heat and pressure of the resin as the cover 12 is molded creates an integral bond at a molecular level with the flanges 34,56. In the positioning of flange 56 relative to flange 34, it will be seen as illustrated in FIGS. 4 and 5 that flange 34 extends radially outwardly beyond outer edge 58 of flange 56. Additionally, flange 34 is configured with anchoring projections 62 and 64.

Thus, the present invention integrally combines the tamper evident ring 26 with the container cover 12 providing an end product for the user which has dual tamper evidence. The removal tear-out diaphragm 36 of the spout 24 provides internal tamper evidence while the molded-in tamper evident ring 26 provides visual external tamper evidence. The integral bond formed by the insert molding process creates a leak-proof cover 12 for the container 10 which is simpler and less expensive to manufacture since the closure 20 is inserted during molding of the cover 12.

The foregoing detailed description has been given for clearness of understanding only and no unnecessary limitations should be understood therefrom as some modifications will be obvious to those skilled in the art without departing from the scope and spirit of the appended claims.

What is claimed is:

1. In an integrally formed component of a container which includes a preform and a component body integrally bonded to said preform, said preform including a spout member forming a passageway and having a peripheral flange, wherein the improvement comprises:

said preform further including a tamper-evident ring having a peripheral flange disposed in adjoining flush engagement with said peripheral flange of said spout member, such that the integral bonding of said component body to said preform includes bonding to said tamper-evident ring.

2. The integrally formed component of claim 1 which further includes a cap member threadedly mounted to said spout member to selectively close said passageway.

3. The integrally formed component of claim 2 wherein said tamper-evident ring is detachably connected to said cap member by a plurality of frangible elements.

4. The integrally formed component of claim 3 wherein the peripheral flange of said tamper-evident ring has an outer edge and wherein the peripheral flange of said spout member extends in a radial direction beyond said outer edge.

5. The integrally formed component of claim 4 wherein said spout member includes internal tamper-evidence means blocking said passageway.

6. The integrally formed component of claim 5 wherein said internal tamper-evidence means is a diaphragm removably mounted within said passageway.

7. The integrally formed component of claim 6 wherein the flange of said spout member includes an anchoring projection.

8. The integrally formed component of claim 1 wherein the peripheral flange of said tamper-evident ring has an outer edge and wherein the peripheral flange of said spout member extends in a radial direction beyond said outer edge.

9. The integrally formed component of claim 1 wherein said spout member includes internal tamper-evidence means blocking said passageway.

10. The integrally formed component of claim 9 wherein said internal tamper-evidence means is a diaphragm removably mounted within said passageway.

11. The integrally formed component of claim 1 wherein the flange of said spout member includes an anchoring projection.

\* \* \* \* \*